United States Patent
Lam et al.

(10) Patent No.: US 9,746,913 B2
(45) Date of Patent: Aug. 29, 2017

(54) SECURED MOBILE MAINTENANCE AND OPERATOR SYSTEM INCLUDING WEARABLE AUGMENTED REALITY INTERFACE, VOICE COMMAND INTERFACE, AND VISUAL RECOGNITION SYSTEMS AND RELATED METHODS

(71) Applicant: The United States of America as represented by the Secretary of the Navy, Washington, DC (US)

(72) Inventors: Jack Lam, Burbank, CA (US); Philippe Navarro, Pasadena, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 121 days.

(21) Appl. No.: 14/869,166

(22) Filed: Sep. 29, 2015

(65) Prior Publication Data

US 2016/0124501 A1    May 5, 2016

Related U.S. Application Data

(60) Provisional application No. 62/073,939, filed on Oct. 31, 2014.

(51) Int. Cl.
*G01C 21/36* (2006.01)
*G06F 3/00* (2006.01)
(Continued)

(52) U.S. Cl.
CPC .......... *G06F 3/011* (2013.01); *G02B 27/017* (2013.01); *G06F 3/017* (2013.01); *G06F 3/048* (2013.01);
(Continued)

(58) Field of Classification Search
CPC .............. G02B 27/017; G02B 27/0093; G01C 21/3632; G06F 3/005
See application file for complete search history.

(56) References Cited

U.S. PATENT DOCUMENTS

| | | |
|---|---|---|
| 6,763,148 B1 | 7/2004 | Sternberg et al. |
| 7,641,342 B2 | 1/2010 | Eberl et al. |

(Continued)

FOREIGN PATENT DOCUMENTS

WO    2009/036782    3/2009

OTHER PUBLICATIONS

Lipson, et al, Online Product Maintenance by Web-Based Augmented Reality; retrieved on 2001; 12 pages.
(Continued)

*Primary Examiner* — Lin Li
(74) *Attorney, Agent, or Firm* — Christopher A. Monsey; Eric VanWiltenburg

(57) ABSTRACT

Secured remote maintenance, configuration management, and systems engineering apparatuses and methods including wearable augmented reality (AR) interface systems are provided. Embodiments can support secure and remote configuration setting changes (CSC) to a system or subsystem of interest (SSoI) using a head mounted device (HMD), a camera, a visual interface section, and a processing section including a plurality of processing instructions operable to operate a command input (CI) interface using one or more user command input CIs (e.g. voice or motion/gesture input recognition) using a secure user authentication systems. HMD machine vision and pattern recognition systems visually identify a SSoI, displaying a 3D model(s) of the SSoI on the HMD's visual interface using the AR interface system, obtaining a plurality of SSoI data, and displaying one or more of the SSoI data in relation to the 3D model on the
(Continued)

HMD visual interface to support various tasks including CI directed CSCs.

11 Claims, 13 Drawing Sheets

(51) Int. Cl.
  *G06F 3/01* (2006.01)
  *G02B 27/01* (2006.01)
  *G02B 27/00* (2006.01)
  *G06F 3/048* (2013.01)
  *G06F 3/16* (2006.01)

(52) U.S. Cl.
  CPC .......... *G02B 2027/014* (2013.01); *G02B 2027/0138* (2013.01); *G02B 2027/0178* (2013.01); *G02B 2027/0187* (2013.01); *G06F 3/167* (2013.01)

(56) References Cited

U.S. PATENT DOCUMENTS

| | | | |
|---|---|---|---|
| 7,768,534 B2 | 8/2010 | Pentenrieder et al. | |
| 7,889,193 B2 | 2/2011 | Platonov et al. | |
| 7,969,383 B2 | 6/2011 | Eberl et al. | |
| 8,016,421 B2 | 9/2011 | Eberl et al. | |
| 8,042,947 B1 | 10/2011 | Eberl et al. | |
| 8,113,657 B2 | 2/2012 | Eberl et al. | |
| 8,125,405 B2 | 2/2012 | Dove et al. | |
| 8,184,070 B1* | 5/2012 | Taubman ............ | G06F 3/012 345/7 |
| 8,254,699 B1 | 8/2012 | Zhao et al. | |
| 8,373,618 B2 | 2/2013 | Friedrich et al. | |
| 8,382,285 B2 | 2/2013 | Eberl et al. | |
| 8,443,186 B2 | 5/2013 | Kang | |
| 8,452,080 B2 | 5/2013 | Engedal | |
| 8,614,747 B2 | 12/2013 | Alt et al. | |
| 8,659,613 B2 | 2/2014 | Meier | |
| 8,675,965 B2 | 3/2014 | Lieberknecht et al. | |
| 8,686,923 B2 | 4/2014 | Eberl et al. | |
| 8,837,779 B2 | 9/2014 | Meier | |
| 9,043,076 B2 | 5/2015 | Bou-Ghannam et al. | |
| 9,088,787 B1 | 7/2015 | Smith et al. | |
| 9,154,695 B2 | 10/2015 | Boncyk et al. | |
| 9,366,862 B2* | 6/2016 | Haddick ............ | G02B 27/0093 |
| 2007/0273610 A1 | 11/2007 | Baillot | |
| 2013/0194164 A1* | 8/2013 | Sugden ............ | G02B 27/017 345/8 |
| 2013/0201215 A1 | 8/2013 | Martellaro et al. | |
| 2013/0278631 A1* | 10/2013 | Border ............ | G02B 27/017 345/633 |
| 2013/0314303 A1* | 11/2013 | Osterhout ............ | G06F 3/005 345/8 |
| 2014/0035951 A1 | 2/2014 | Martellaro et al. | |
| 2014/0225814 A1 | 8/2014 | English et al. | |
| 2014/0254874 A1 | 9/2014 | Kurz et al. | |
| 2014/0293016 A1 | 10/2014 | Benhimane et al. | |
| 2014/0310595 A1 | 10/2014 | Acharya et al. | |
| 2015/0146007 A1 | 5/2015 | Dusik et al. | |
| 2015/0244903 A1 | 8/2015 | Adams | |
| 2015/0286515 A1 | 10/2015 | Monk | |
| 2015/0288868 A1 | 10/2015 | Slavin et al. | |
| 2016/0061613 A1* | 3/2016 | Jung ............ | G01C 21/3632 701/49 |

OTHER PUBLICATIONS

Amra: Augmented Reality Assistance for Train Maintenance Tasks; Didier et al.; retrieved from https://hal.archives-ouvertes.fr/hal-00339457 on Sep. 17, 2009; 12 pages.

Lam et al., Enhanced Trajectory Based Similarity prediction with Uncertainty Quantification, Annual Conference of the Prognostics and Health Management Society 2014; 12 pages.

Joel Hruska, Google Patents RealWorld Image Recognition Algorithm For Video, Photography, published Sep. 1, 2012, printed Sep. 29, 2015 from http://hothardware.com/News/Google-Patents-RealWorld-Image-Recognition-Algorithm-For-Video-Photography/.

Rollin Bishop, Google Granted Patent for Automatic Object Recognition in Videos, published Aug. 29, 2012, printed Sep. 29, 2015 from http://www.themarysue.com/google-object-recognition/.

* cited by examiner

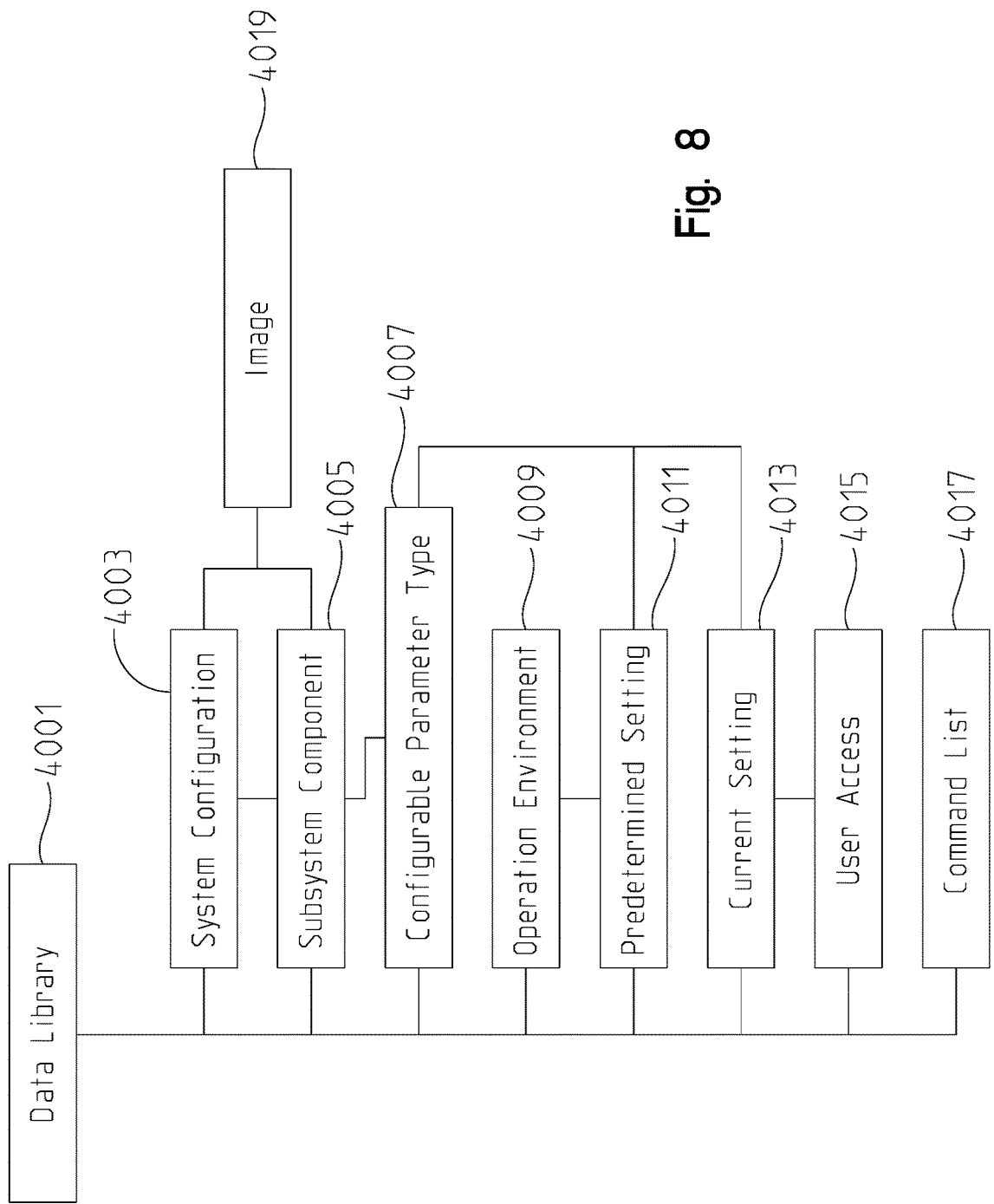

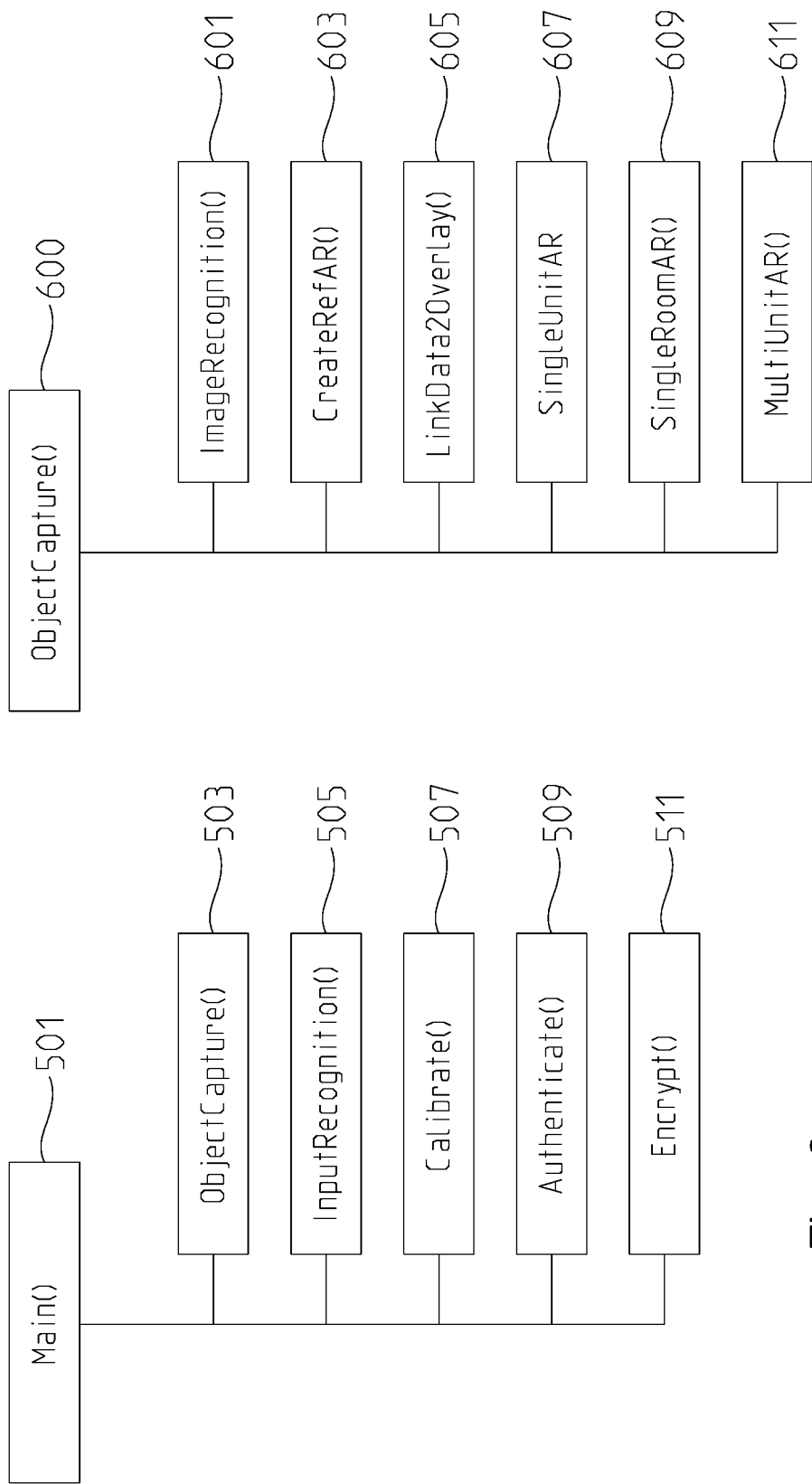

US 9,746,913 B2

SECURED MOBILE MAINTENANCE AND OPERATOR SYSTEM INCLUDING WEARABLE AUGMENTED REALITY INTERFACE, VOICE COMMAND INTERFACE, AND VISUAL RECOGNITION SYSTEMS AND RELATED METHODS

CROSS-REFERENCE TO RELATED APPLICATIONS

The present application claims priority to U.S. Provisional Patent Application Ser. No. 62/073,939, filed Oct. 31, 2014, entitled "METHOD AND APPARATUS OF SECURED REMOTE CALIBRATION WITH VISUAL RECOGNITION," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,097) is assigned to the United States Government and is available for licensing for commercial purposes. Licensing and technical inquiries may be directed to the Technology Transfer Office, Naval Surface Warfare Center Port Hueneme.

BACKGROUND AND SUMMARY OF THE INVENTION

This disclosure relates to secure, automated, augmented reality, and interactive control, operation, maintenance, system engineering, and configuration management apparatuses and methods that can wirelessly interact with data libraries as well as engineering and maintenance activities at a different location and employs wearable interface systems. In particular, aspects of embodiments of the invention can include wearable electronic systems that provide an augmented reality system which generates a wearable visual interface for facilitating a variety of tasks, employs machine vision pattern recognition (e.g., shape or bar code associated with selected equipment), and includes variety of user command input interfaces (e.g. gesture recognition, voice command, and/or other interfaces e.g., a wireless keyboard or digital stylus). Apparatuses and methods can include support for tasks such as a configuration management task, e.g., visual recognition and overlays of stored engineering drawings to support verification of technical data (e.g., technical data verification based on machine vision comparisons with stored three dimensional model based engineering technical drawings and associated data), equipment calibration tasks supported via visual and voice command interfaces, visual overlays of equipment or subassemblies showing operational or maintenance status information from remote data servers, etc.

Control and maintenance of multiple fielded systems in remote locations or systems without physical access poses a significant logistics and human systems challenge. For example, remote location maintenance or control can require changes of configurable parameters in subsystems of systems that frequently require on-site personnel and technical data libraries. Some efforts have been made to provide remote control and maintenance capabilities. However, existing systems are not integrated into visualization technology for a user to monitor and change selected configurable parameters within subsystems of a system and be able to connect to a fleet of systems in an operation location. Existing systems are also vulnerable to system intrusion and interruption the performance of remote maintenance function or operations due to inadequate or lack of cybersecurity such as user authentication and encryption of data.

In one embodiment of the present invention, a user with a head mounted device (HMD) can be positioned with respect to a system under test with various embodiments of the invention. Another embodiment can incorporate an object with a marking designator to reference to a group of systems and their subsystems. Image recognition and augmented reality technology can be used to identify the system under test and generate one or more three-dimensional models of a system and associated subsystems with configurable parameters. Voice and gesture recognition can be incorporated to initiate a command to enable remote calibration. Authentication system and encryption methods can also be included to provide cybersecurity functionality to use various embodiment of the invention in an operational environment where data intrusion is expected. Additional elements can include remote transmission to a remote server with an authentication service and data library as well as a capability to enable operation and data retrieval from the remote server as well as facilitating support personnel at different locations to interact with on-site equipment and personnel in a variety of ways.

In general, aspects of the invention can include a secured remote maintenance, configuration management, and systems engineering apparatuses and methods including wearable augmented reality interface systems. Embodiments can include machine vision visual recognition, multiple command interfaces, location and orientation system, wireless communication system coupled with one or more remote data sources, interactive remote maintenance support, fault troubleshooting, maintenance and operational status, and calibration elements. Embodiments can support interactions with a system or subsystem of interest (SSoI) such as, e.g., secure and remote configurable setting changes to a system of interest or equipment within, e.g., a ship. An embodiment can include wearable systems such as, e.g., a HMD. The HMD can include one or more controller elements and/or processing sections including a plurality of processing instructions operable to operate the HMD and its sub-components such as e.g., command input interface using one or more user command input (CI) interfaces (e.g. voice, keyboard, or motion/gesture recognition) using secure user authentication systems (SUAS). HMD machine vision and pattern recognition systems can be used to visually identify a SSoI using the SUAS with a local or remote data storage, displaying a 3D model(s) of the SSoI on a visual interface of the HMD over the SSoI using an augmented reality (AR) control section, communicating with SSoI or its monitoring system to obtain a plurality of SSoI data with the SAUS and displaying one or more of the SSoI data in relation to the 3D model on the HMD visual interface. The HMD can obtain and display a comparison of a plurality of SSoI data including configurable parameters with one or a plurality of predetermined SSoI settings based on one or a plurality of operational conditions, receiving a CI request for a change of at least one configurable parameter of the SSoI, and enabling an authentication of the CI request with user access data at the local or remote data storage system.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 8 shows a simplified data structure including aspects associated with a data library in accordance with one exemplary embodiment of the invention;

FIG. 9 shows an exemplary functional description of machine readable instructions of a main function in accordance with an embodiment of the invention adapted to interact with an exemplary processing section;

FIG. 10 shows an exemplary functional description of machine readable instructions of an object capture function in accordance with an embodiment of the invention adapted to interact with an exemplary processing section;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
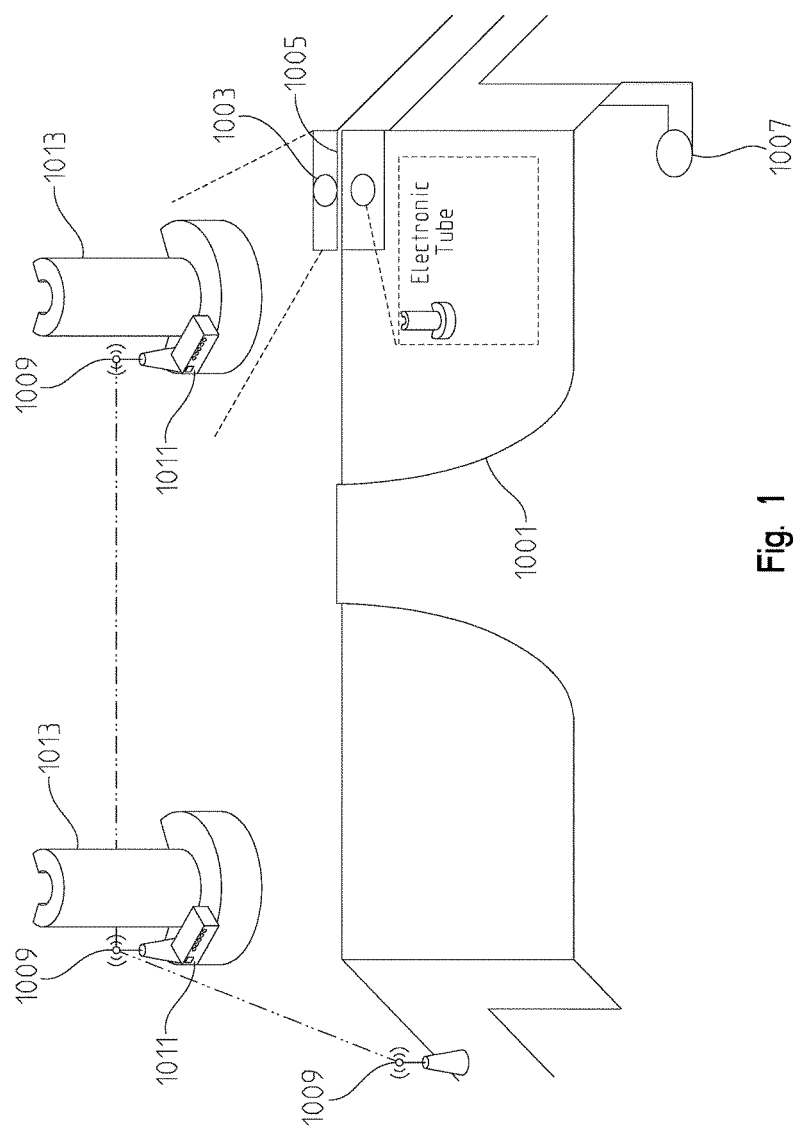
FIG. 1 shows a head-mounted device and a controller device in an operational position relative to a user and an electronic device that requires changes to a plurality of configurable parameters in accordance with one exemplary embodiment of the invention.

FIG. 1 shows an exemplary head-mounted device 1001 in an exemplary operational position in accordance with one embodiment of the invention. In particular, the head-mounted device 1001 is shown in an exemplary operational position relative to a plurality of electronic devices 1013 which enables a camera system 1003 attached in an exemplary position on the head-mounted device 1001 to have in its field of view (FOV) a plurality of electronic devices 1013. A graphical user interface display system 1005 is shown in an exemplary position on the head-mounted device 1001 to show information regarding the plurality of electronic device 1013. A microphone 1007 is shown in an exemplary position on the head-mounted device 1001 to enable a user to verbally issue machine instruction that are received by the microphone 1007. A first transceiver 1009 is shown in an exemplary position on a head-mounted device 1001 to wirelessly exchange information or signals with a plurality of second transceivers 1009 on a plurality of electronic devices 1013. A plurality of controller devices 1011 are shown in an exemplary position on the plurality of electronic devices 1013 to execute machine instruction for receiving sensor input and output calibration output.

An alternative embodiment can also allow a hand input device in an exemplary position on the head-mounted device 1001 to also enable inputs of machine instructions. Another alternative embodiment can allow gesture movement in front of the camera system 1003 to input the gesture movements as a video or image which is then associated with matching gesture movement and stored machine instruction which then is used to initiate control inputs into various elements of the invention or system. Yet another alternative embodiment allows different type of the plurality of systems under test 1013 be used for calibration. Another alternative embodiment allows a plurality of transceivers 1009 to communicate physically through a wire or wirelessly. Yet another alternative embodiment allows a HMD 1001 to be connected directly to the system under test 1013 with a mounting structure that houses a transceiver 1009 and capability of controller device 1011.

Figure 2:
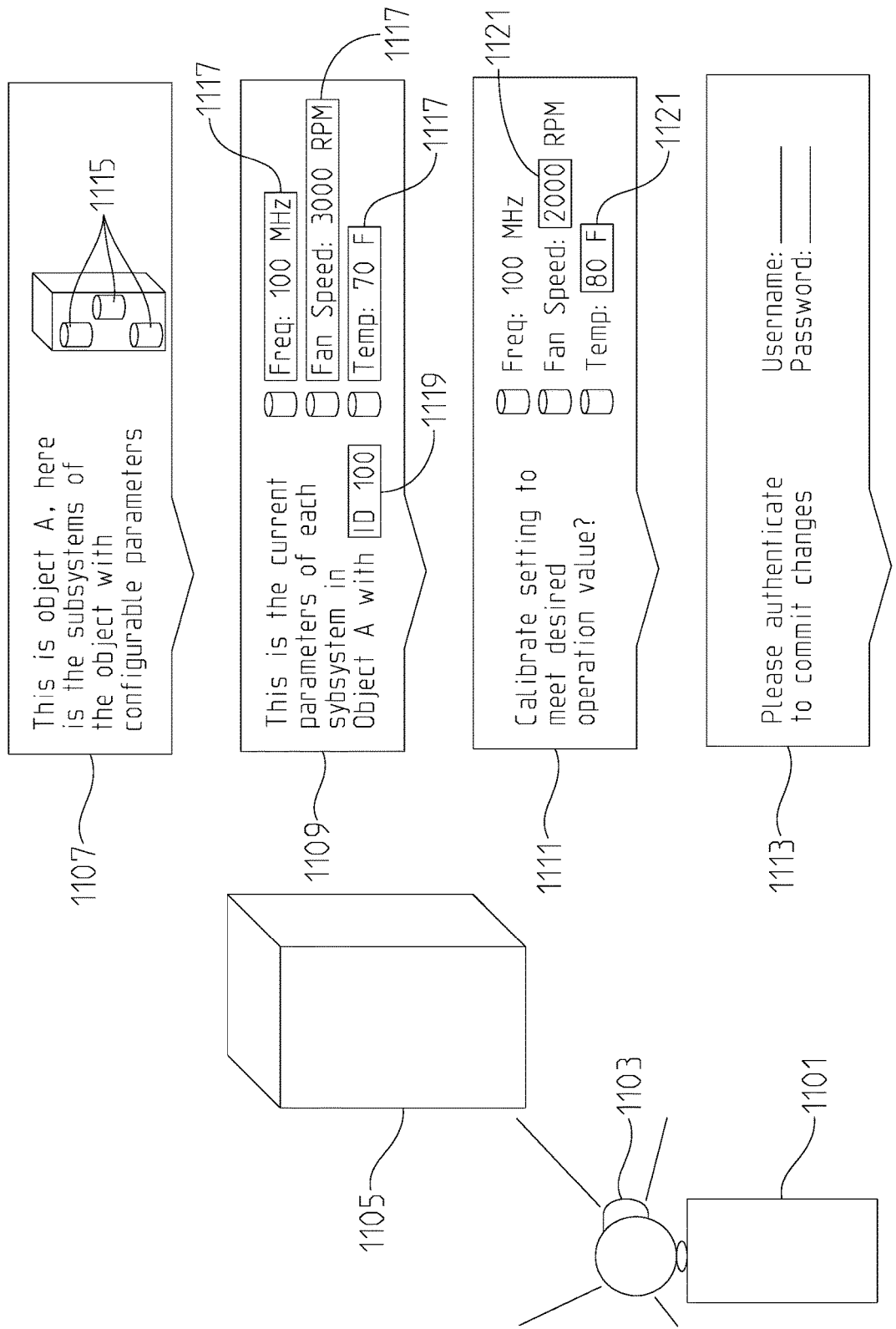
FIG. 2 shows a graphical user interface in an operational position relative to a user with a system under test in accordance with one exemplary embodiment of the invention.

FIG. 2 shows a graphical user interface in an operational position relative to a user with a system under test in accordance with one embodiment of the invention. A human or user 1101 with a head-mounted device 1103 is shown in an exemplary operation position relative to a system under test 1105. A graphical user interface 1107 is shown and used to identify the system under test 1105 and generate and/or display a plurality of subsystems 1115 in the form of a plurality of augmented reality three-dimensional models stored within a database in a HMD 1103 and an external server (not shown). Alternative embodiments can include a variety of augmented reality systems that can be used such as disclosed in, for example, U.S. Patent Pub. 2014/0225814, Method And System For Representing And Interacting With Geo-Located Markers, U.S. Pat. Pub. 2014/0035951, Visually Passing Data Through Video, or U.S. Pat. Pub. 2013/0201215, Accessing Applications in a Mobile Augmented Reality Environment, U.S. Pat. Pub. 2014/0293016, Method for Estimating a Camera Motion and for Determining a Three-Dimensional Model of a Real Environment, U.S. Pat. Pub. 2014/0254874, Method of Detecting and Describing Features from an Intensity Image, U.S. Pat. No. 8,837,779, Method for determining the pose of a camera and for recognizing an object of a real environment, U.S. Pat. No. 8,686,923, Interactive data view and command system, U.S. Pat. No. 8,675,965, Method and system for analyzing an image generated by at least one camera, U.S. Pat. No. 8,659,613, Method and system for displaying an image generated by at least one camera, U.S. Pat. No. 8,614,747, Composite image generating system, overlaying condition determining method, image processing apparatus, and image processing program, U.S. Pat. No. 8,452,080, Camera pose estimation apparatus and method for augmented reality imaging, U.S. Pat. No. 8,382,285, Device and method for determining the orientation of an eye, U.S. Pat. No. 8,113,657, Device and method for determining the orientation of an eye, U.S. Pat. No. 8,042,947, Information system, U.S. Pat. No. 8,016,421, Information system and method for providing information using a holographic element, U.S. Pat. No. 7,969,383, Interactive data view and command system, U.S. Pat. No. 7,889,193, Method of and system for determining a data model designed for being superposed with an image of a real object in an object tracking process, U.S. Pat. No. 7,768,534, Method of and system for determining inaccuracy information in an augmented reality system, and U.S. Pat. No. 7,641,342, Information system and method for providing information using a holographic element, the disclosures of which are incorporated by reference herein. A graphical user interface 1109 is shown to provide or display a plurality of configurable parameters 1117 with various colors to graphically associate one or more of a plurality operational states for the plurality of subsystems 1115 which is created in part by communicating with a plurality of controller devices (not shown) inside the system under test 1105 and obtaining operational state data from the controller devices used to graphically associate the one or more plurality of operational states. The graphical user interface 1109 is also shown to provide a unique identifier 1119 of the system under test 1105 by communicating with the plurality of controller devices (not shown) inside the system under test 1105. A graphical user interface 1111 is shown to request a user input to change the plurality of configurable parameters 1117 with a plurality of configurable parameters 1121 with an exemplary color. A graphical user interface 1113 is shown to request the user input to provide user access information to authenticate the changes to be made in the graphical user interface 1111.

Figure 3:
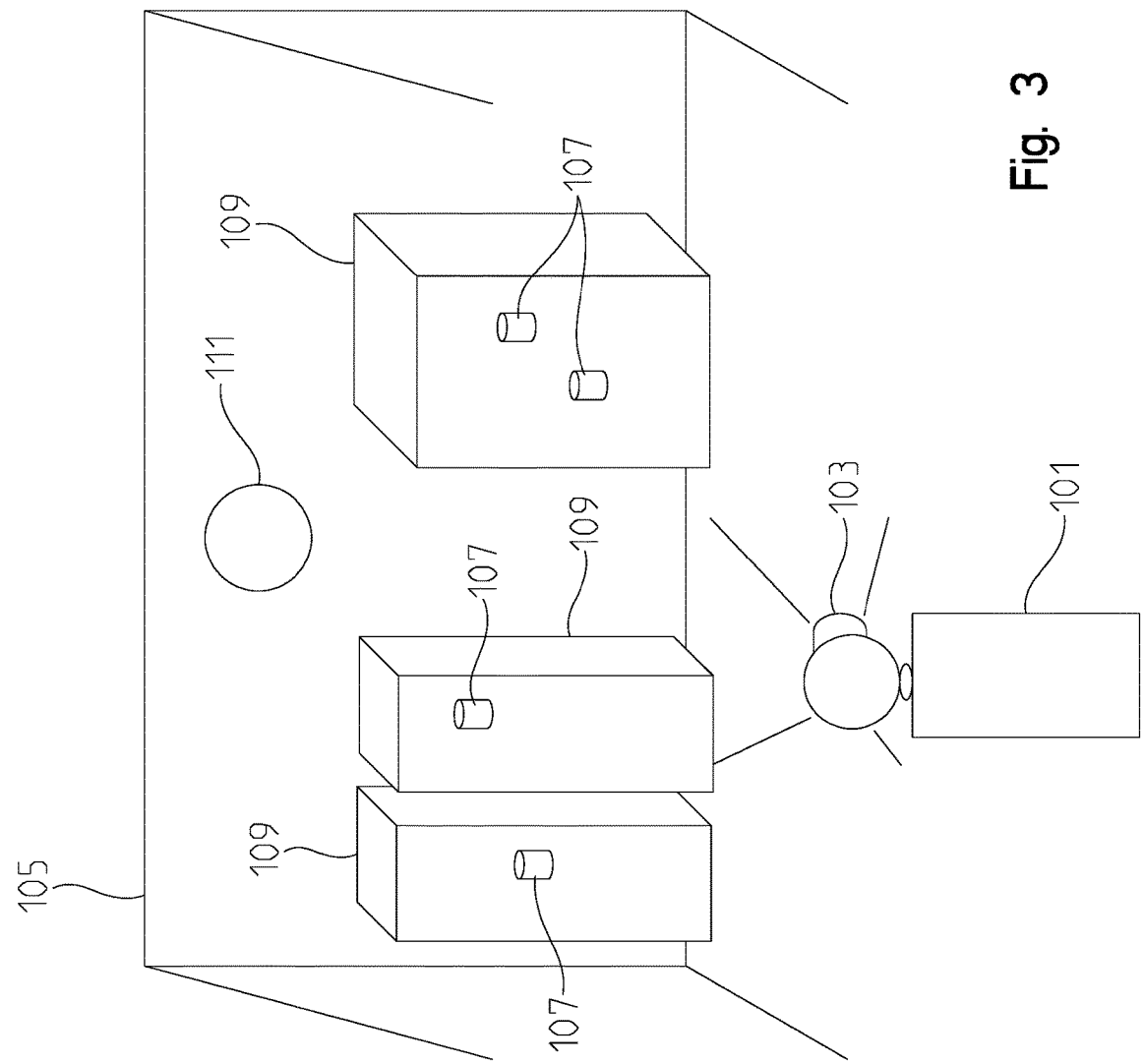
FIG. 3 shows a head-mounted device and a plurality of systems under test in an operational position relative to a user and a geographic location in accordance with one exemplary embodiment of the invention.

FIG. 3 shows a head-mounted device 103 in an exemplary operational position relative to a user on an exemplary location in accordance with one embodiment of the invention. User 101 with the head-mounted device 103 is shown in an exemplary operational position relative to a location 105, which enables the user 101 to communicate with a plurality of controller devices 107 attached on a plurality of operational positions relative to a plurality of systems under test 109. An exemplary system with a marking feature 111 is shown attached on an exemplary position to the location 105 to serve as a reference for the user 101 to identify the plurality of controller devices 107 and the systems under test 109 within the location 105.

An alternative embodiment can also allow the user 101 in an exemplary operational position where only a system with the marking feature 111 is visible to the user 101 to allow augmented reality software to identify and communicate with the plurality of controller devices 107 relative to the location 105. Another alternative embodiment can allow a system with the marking feature 111 be in a position outside the location 105 to allow the user 101 to remotely visualize the plurality of controller devices 107 to provide parameter changes to the plurality of systems under test 109.

Figure 4:
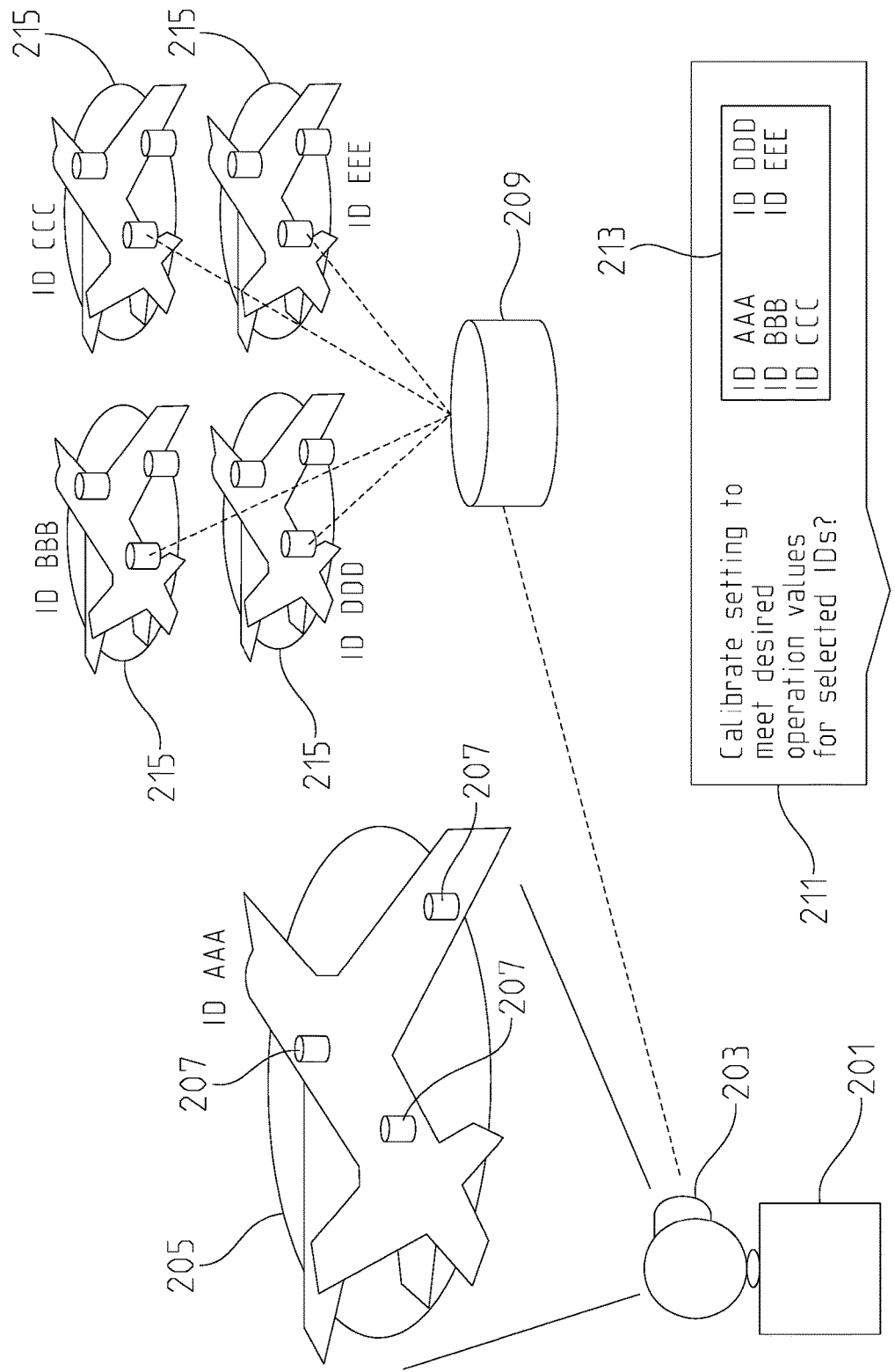
FIG. 4 shows a head-mounted device and a controller device in an operational position relative to a user and a plurality of system under tests where an external server is connected to a plurality of controller devices on a plurality of system under tests in accordance with one exemplary embodiment of the invention.

FIG. 4 shows an exemplary head-mounted device 203 in an operational position relative to a user 201 with a system under test visible to the user and is connected through an external server 209 to a plurality of systems under test 215. The user 201 with a HMD 203 is shown looking at a system under test 205 which can include a plurality of subsystems 207 in an exemplary plurality of positions on the system under test 205 to allow the HMD 203 to calibrate the plurality of controller devices 207 on the system under test 205 simultaneously. The HMD 203 is shown communicating with the external server 209 which can also communicate with the plurality of systems under test 215 not in the FOV of the user 203 and allow the HMD 203 to change a plurality of operational parameters to the plurality of systems under test 205 simultaneously in a position outside of the FOV of the user 203. A graphical user interface 211 is shown requesting confirmation to change the plurality of configurable parameters for the plurality of systems under test 205 with a plurality of unique identifiers 213.

Figure 5:
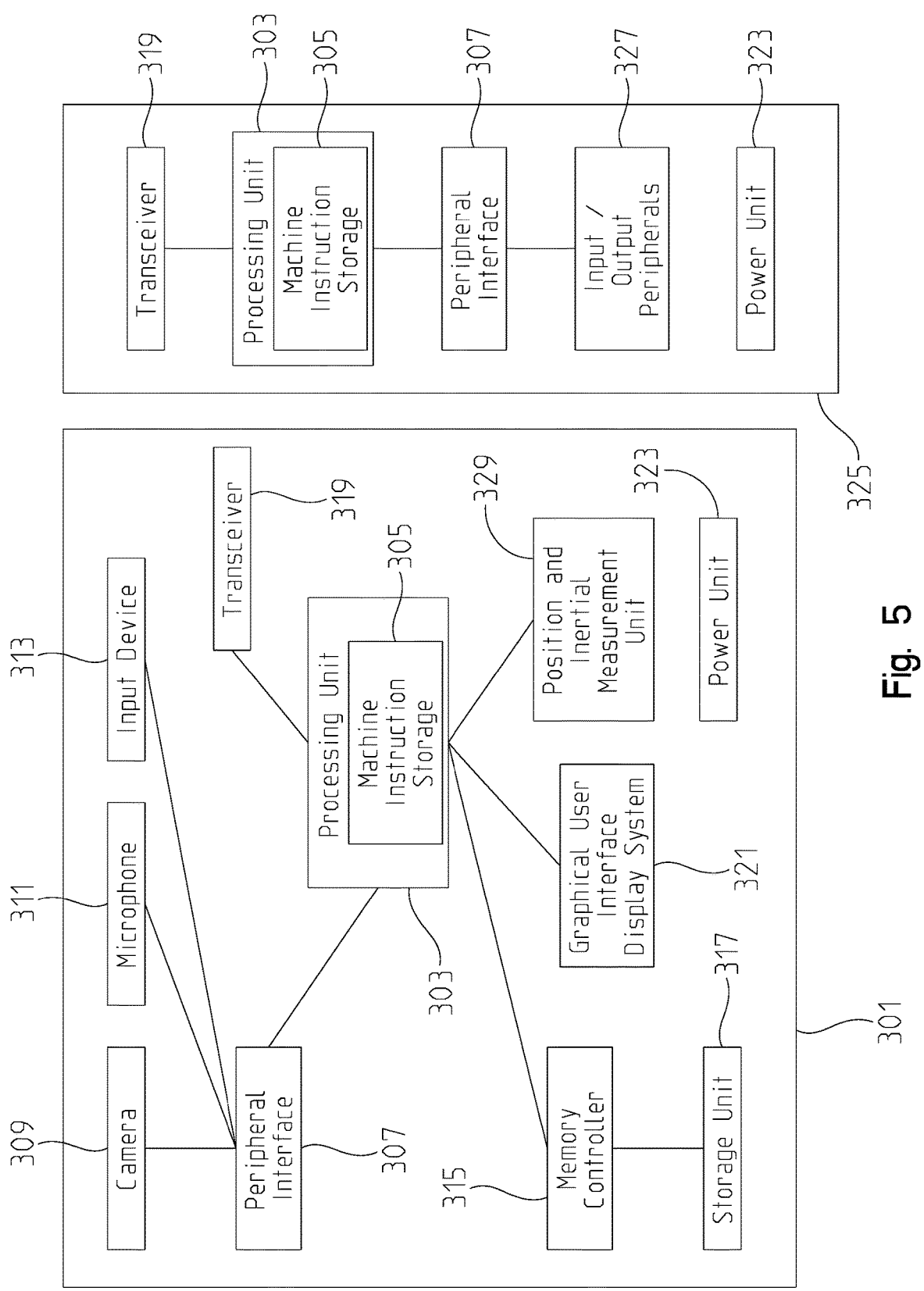
FIG. 5 shows a system overview in accordance with one embodiment of the invention.

FIG. 5 shows a functional systems block diagram of yet another embodiment of the invention. A HMD 301 can be comprised of a camera 309, a microphone 311, an input device 313, a transceiver 319, and a power unit 323, a peripheral interface 307, a processing unit 303, a memory controller 315, a storage unit 317, a graphical user interface display system 321 configured with a transparent element disposed within a FOV of a use wearing the HMD 301 and an image projector system which generates graphical displays that are projected on the transparent element in the user's FOV, and a position and inertial measurement unit 329. The position and inertial measurement system 329 can be used to determine orientation of the HMD in order to enable creating the graphical displays that are projected on the transparent element that are aligned over or next to one or more SSoIs is the HMD transparent element FOV. The peripheral interface 307 in the HMD 301 can be connected to the camera 309, the microphone 311, the processing unit 303, and the input device 313. The processing unit 303 on the HMD 301 can be connected to the memory controller 315, the peripheral interface 307, the transceiver 319, the graphical user interface display system 321, and the position and inertial measurement unit 329. The memory controller 315 is connected to the storage unit 317 inside of the HMD 301. A controller device 325 can be comprised of the processing unit 303, the peripheral interface 307, the transceiver 319, the power unit 323, and a plurality of input/output peripherals 327. The processing unit 303 on the controller device 325 can be connected to the transceiver 319 and the peripheral interface 307. The peripheral interface 307 on the controller device 325 can be connected to the processing unit 303 and the plurality of input/output peripherals 327. A machine readable instructions storage 305 can be stored inside the processing unit 303, and can be operable to control aspects of the invention such as the controller device 325 and the camera 309.

Figure 6:
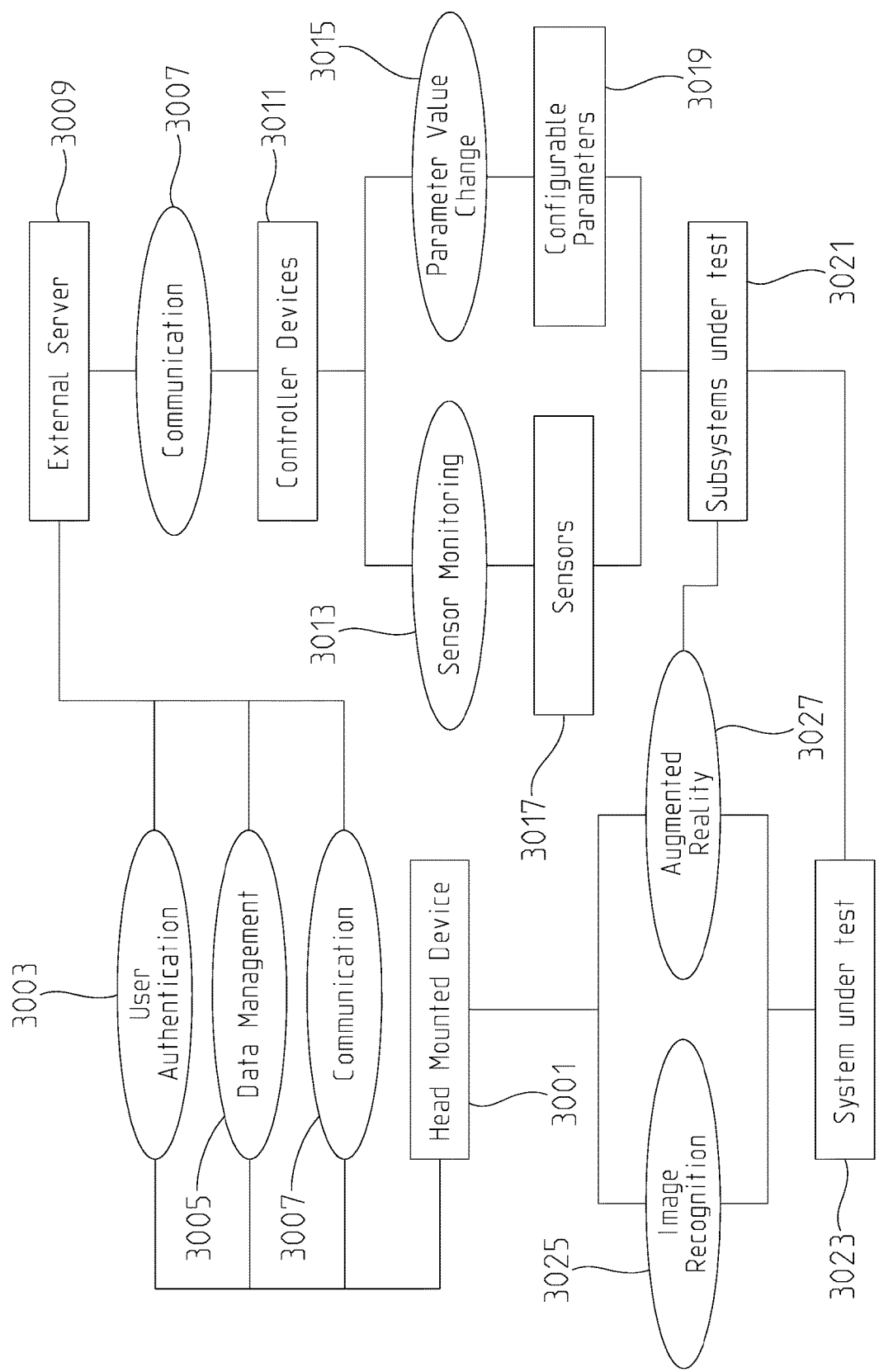
FIG. 6 shows a drawing showing a functional interface diagram in accordance with one embodiment of the invention.

FIG. 6 shows a functional interface diagram of one embodiment of the invention. A HMD 3001 is shown to interface with an external server 3009 to provide a user authentication service 3003 to authenticate a user (not shown) with the HMD 3001 against the user's access data in the external server 3009 when making changes to a plurality of configurable parameters on a plurality of subsystems under test 3021 as part of a system under test 3023. The HMD 3001 is shown to interface with the external server 3009 and to request a data exchange service 3005 to extract data information from a data library (not shown) in the external server 3009. The HMD 3001 is shown to interface with the external server 3009 to provide a communication function 3007 to transmit and receive a plurality of readable machine instructions. The HMD 3001 is shown to interface with the system under test 3023 to identify the system under test 3023 using an image recognition function 3025 and to project a plurality of three dimensional models on the system under test 3023 and the plurality of subsystems under test 3021 which contains a plurality of configurable parameters 3019 and a plurality of sensors 3017 using an augmented reality function 3027. The external server 3009 is shown to interface with a plurality of controller devices 3011 to provide the communication function 3007 to transmit and receive a plurality of readable machine instructions. The plurality of controller devices 3011 is shown to interface with the plurality of sensors 3017 on the plurality of subsystems under test 3021 to provide a monitoring function 3013 on a plurality of subsystems under test 3021 as part of the system under test 3023. The plurality of controller devices 3011 is also shown to interface with the plurality of configurable parameters 3019 to provide a parameter value change function 3015 to change the plurality of configurable parameters 3019 on the plurality of subsystems under test 3021 as part of the system under test 3023. A variety of image recognition systems can be used with the invention including a system which uses a video system to capture an image, overlay a grid over the image, and then apply pattern matching to the image grid overlay to perform image matching and identification functions. Other embodiments of an image recognition system section can include systems such as, for example, U.S. Pat. No. 6,763,148, Image recognition methods, and U.S. Pat. No. 8,254,699, Automatic large scale video object recognition, the disclosures of which are incorporated by reference herein.

Figure 7:
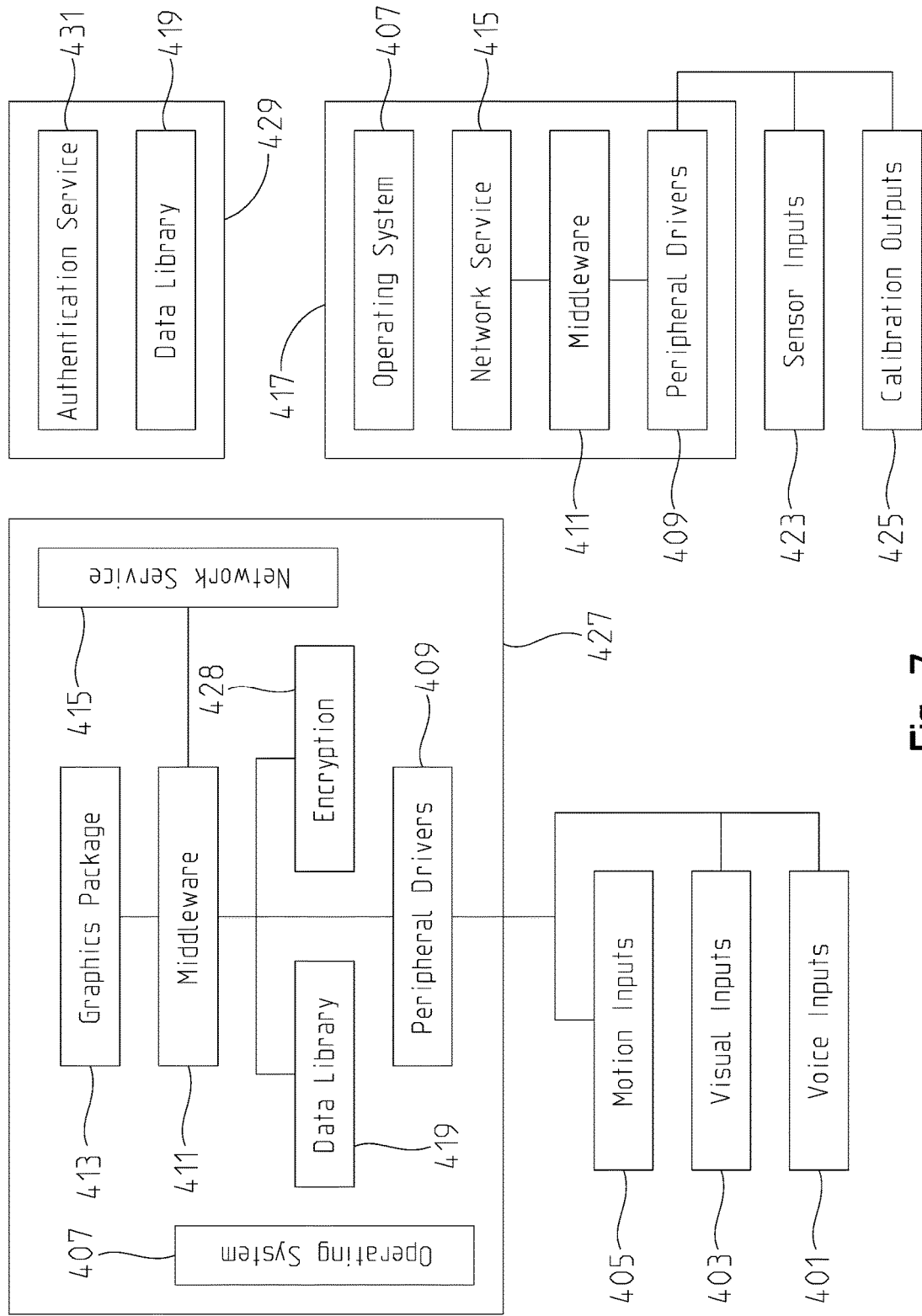
FIG. 7 shows an overview of a set of simplified software modules in accordance with one embodiment of the invention.

FIG. 7 shows a plurality of software applications of the processing section of one embodiment of the invention. A HMD 427 comprises, as software, of an operating system 407, a plurality of peripheral drivers 409, a middleware 411, a data library 419, an encryption service 428, a network service 415, and a graphics package software 413. Various embodiments of an authentication and encryption system can be used such as, for example, as disclosed in U.S. Pat. No. 8,443,186, Method and device of data encryption, the disclosure of which is incorporated by reference herein. The plurality of peripheral drivers 409 on the HMD 427 receives and interprets a plurality of motion inputs 405, a plurality of visual inputs 403, and a plurality of voice inputs 401. A controller device 417 comprises, as software, of the operating system 407, the network service 415, the middleware 411, and the plurality of peripheral drivers 409. The plurality of peripheral drivers 409 on the controller device 417 receives and interprets a plurality of sensor inputs 423. The plurality of peripheral drivers 409 on the controller device 417 interprets and issues a plurality of calibration outputs 425. The network service 415 on the HMD 427 can communicate with the network service 415 on the controller device 417. An external server 429 is shown to store a plurality of data in the data library 419 such as user access data, configuration data and parameter data. The external server 429 is also shown to provide an authentication service 431 to authenticate a user and to make changes to a plurality of configurable parameters. The external server 429 can also communicate with the HMD 427 and the plurality of controller devices 417.

FIG. 8 shows an exemplary set of data structures of a data library 4001. This embodiment of the invention is operable to identify a plurality of data to be processed such as described in FIG. 7. The data library 4001 includes a plurality of system configuration data 4003, a plurality of subsystem component data 4005, a plurality of configurable parameter data type 4007, a plurality of operation environment data 4009, a plurality of predetermined settings 4011, a plurality of current setting data 4013, a plurality of user access data 4015, and a plurality of command list data 4017. The plurality of system configuration data 4003 hierarchically includes the plurality of subsystem component data 4005. The plurality of subsystem component data 4005 hierarchically includes the plurality of configurable parameter data type 4007. The plurality of system configuration data 4003 and the plurality of subsystem component data 4005 includes a plurality of image data 4019 referencing a plurality of three-dimensional models (not shown) which represent a plurality of systems under test (not shown) and a plurality of subsystems under test (not shown). A plurality of predetermined settings can be provided from the plurality of operation environment data 4009 and the plurality of configurable parameter data type 4007. A plurality of current settings can be provided from the plurality of configurable parameter data type 4007. The plurality of user access data 4015 is used to authenticate the user to make changes to the plurality of current setting 4013.

FIG. 9 shows an exemplary simplified computer source code representation, provided in accordance with an embodiment of the invention operable to execute processing such as that described in FIG. 7. A main function 501 calls a plurality of functions that places an execute function comprising a receive request for an ObjectCapture function 503, an InputRecognition function 505, a Calibrate function 507, an Authenticate function 509, and an Encrypt function 511.

FIG. 10 shows an exemplary simplified computer source code representation, provided in accordance with an embodiment of the invention operable to execute processing such as that described in FIG. 7. An ObjectCapture function 600 calls a plurality of functions that places an execute function comprising a receive request for an ImageRecognition function 601, CreateRefAR function 603, a LinkData2Overlay function 605, a SingleUnitAR function 607, a SingleRoomAR function 609, and a MultiUnitAR function 611.

Figure 11:
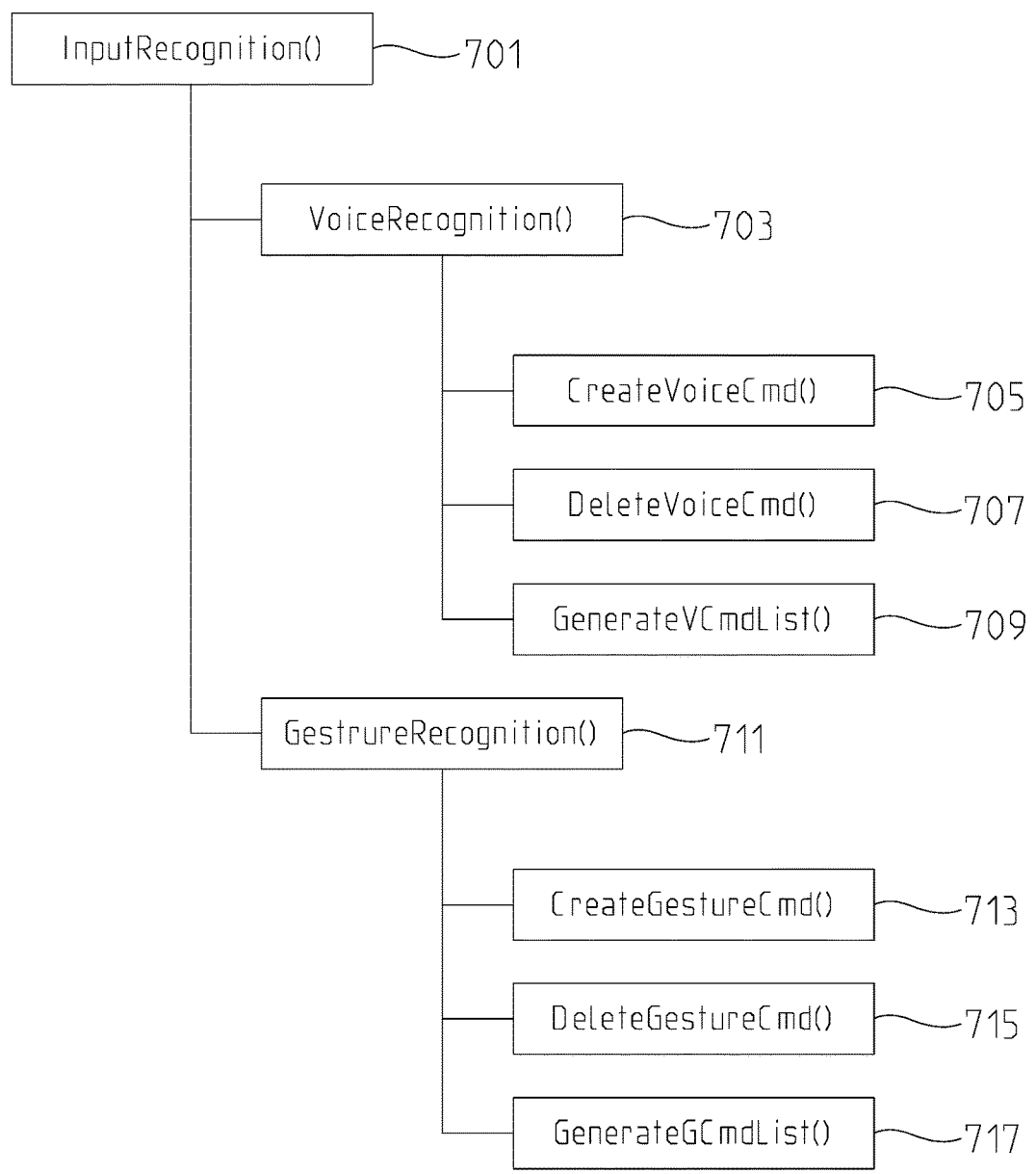
FIG. 11 shows an exemplary functional description of machine readable instructions of an input recognition function in accordance with an embodiment of the invention adapted to interact with an exemplary processing section.

FIG. 11 shows an exemplary simplified computer source code representation provided in accordance with an embodiment of the invention operable to execute processing such as that described in FIG. 7. An InputRecognition function 701 is provided which calls a plurality of functions that places an execute function comprising a receive request for a VoiceRecognition function 703 and a GestureRecognition function 711. The VoiceRecognition function 703 is provided which calls a plurality of functions that places an execute function comprising a receive request for a CreateVoiceCmd function 705, a DeleteVoiceCmd function 707, and a GenerateVCmdList function 709. The GestureRecognition function 711 is provided which calls a plurality of functions that places an execute function comprising a receive request for a CreateGestureCmd function 713, a DeleteGestureCmd function 715, and a GenerateGCmdList 717.

Figure 12:
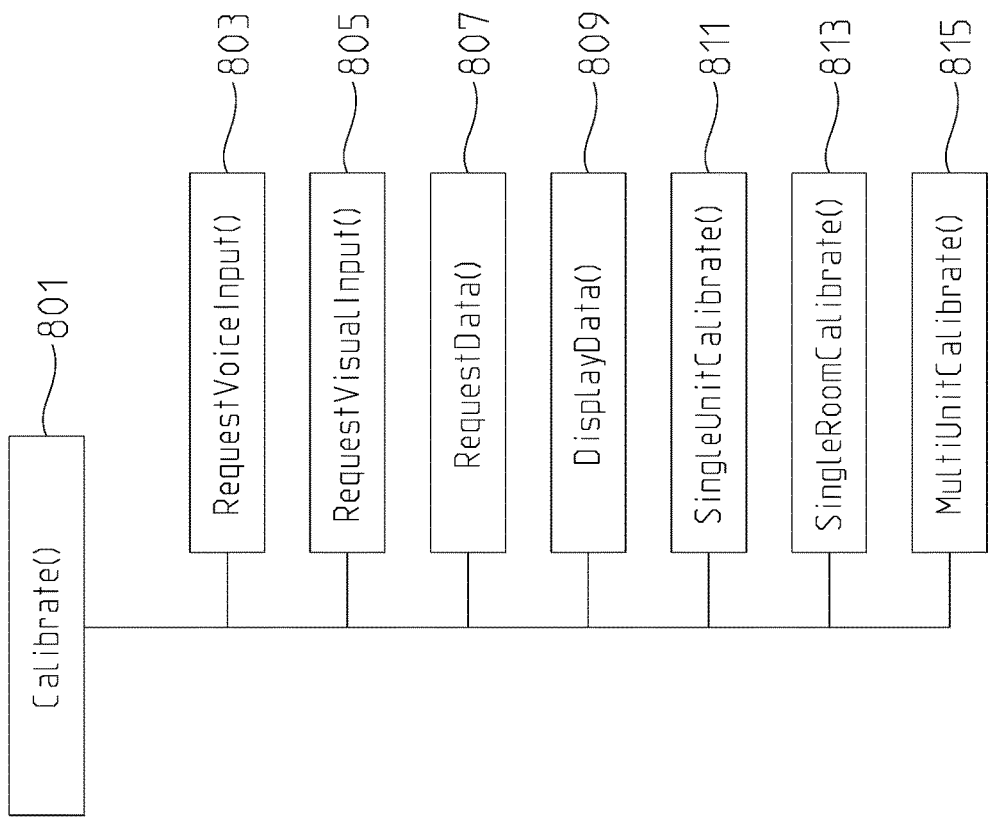
FIG. 12 shows an exemplary functional description of machine readable instructions of a calibration function in accordance with an embodiment of the invention adapted to interact with an exemplary processing section.

FIG. 12 shows an exemplary simplified computer source code representation provided in accordance with an embodiment of the invention operable to execute processing such as that described in FIG. 7. A Calibrate function 801 is provided which calls a plurality of functions that places an execute function comprising a receive request for a RequestVoiceInput function 803, a RequestVisualInput function 805, a RequestData function 807, a DisplayData function 809, a SingleUnitCalibrate function 811, a SingleRoomCalibrate function 813, and a MultiUnitCalibrate function 815.

Figure 13A:
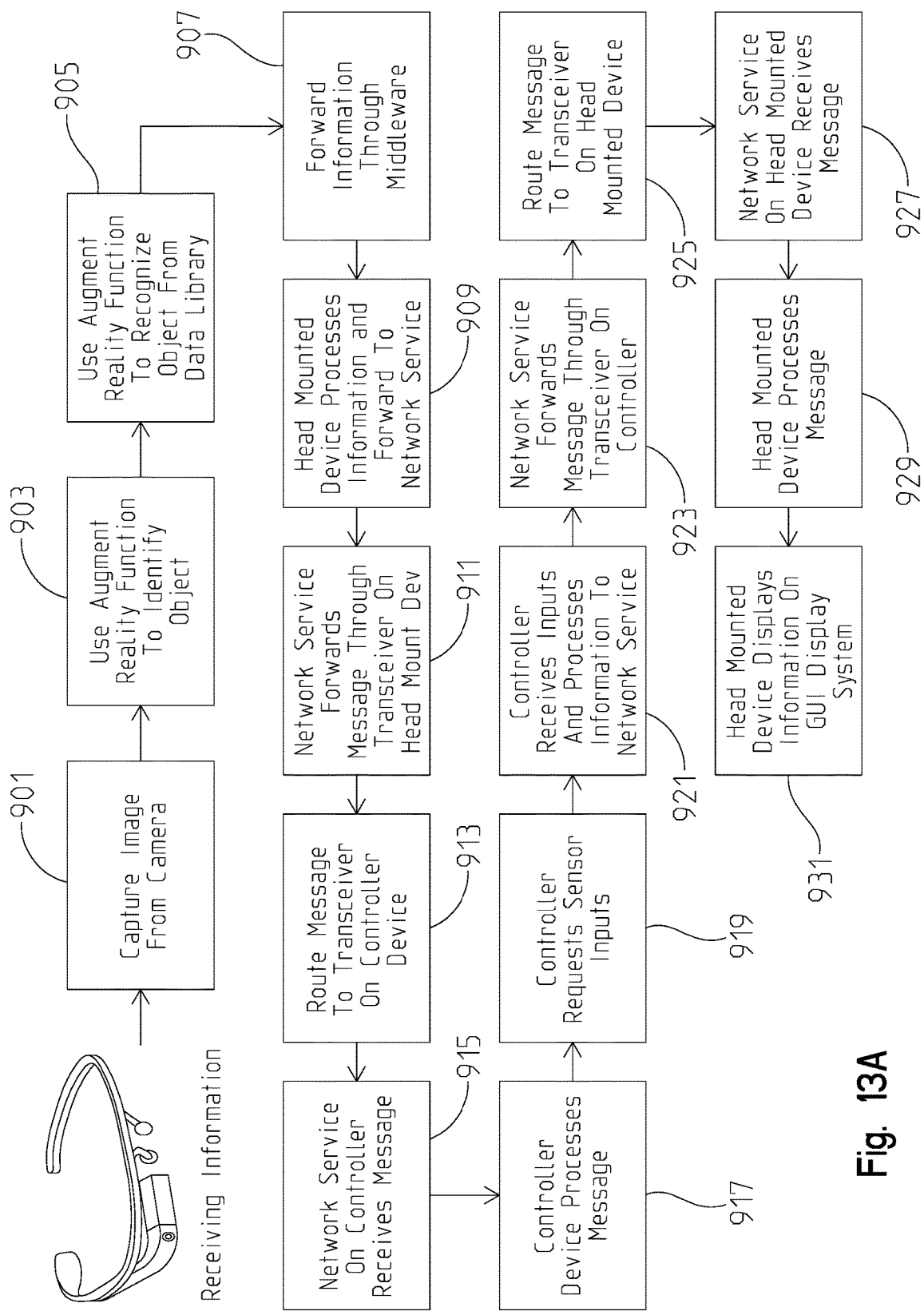
FIGS. 13A and 13B show an exemplary method of operation for a remote calibration using visual recognition which includes an exemplary embodiment of the invention.
Figure 13B:
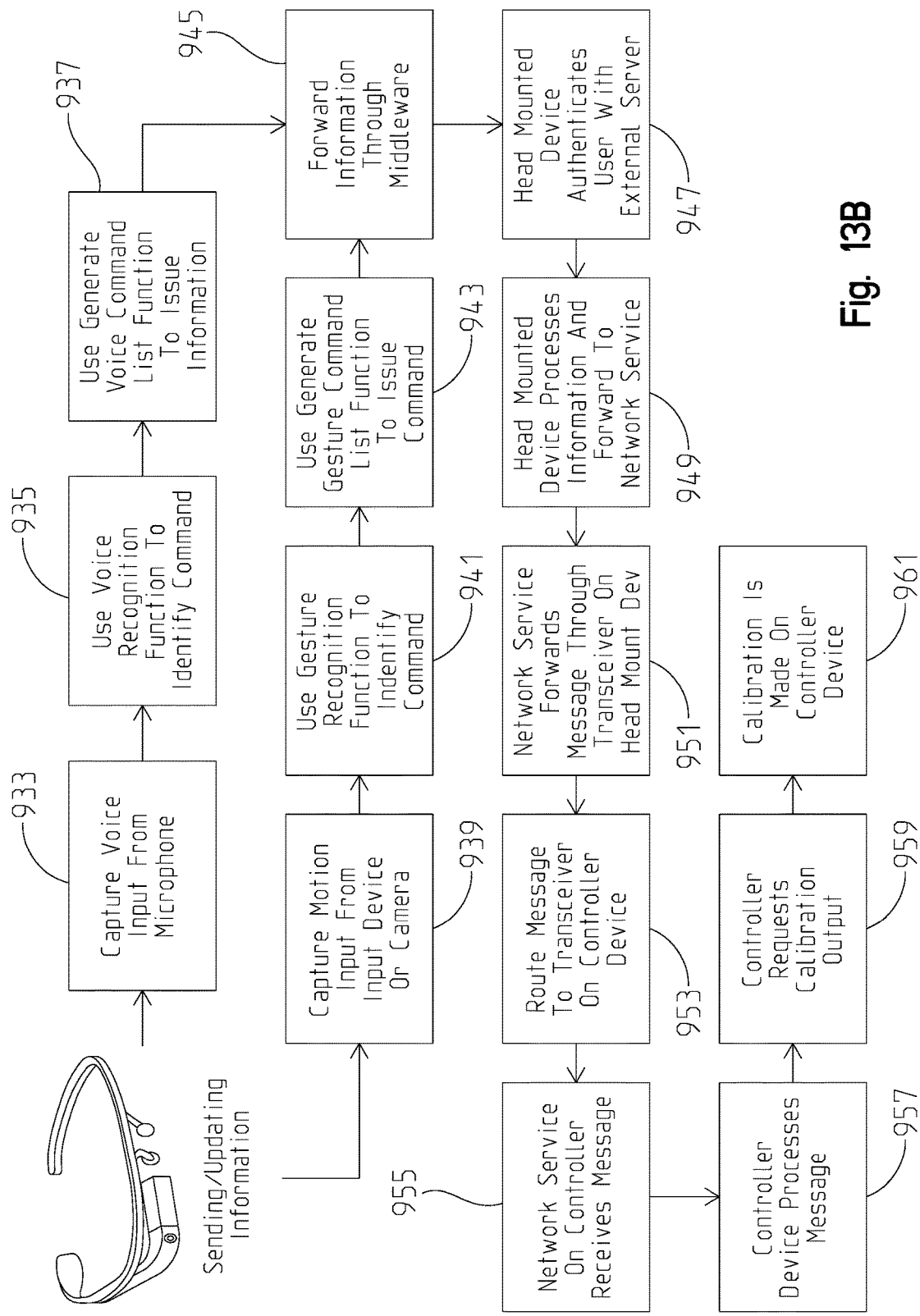

FIGS. 13A and 13B show one exemplary method of operation for remote calibration using visual recognition and incorporating an embodiment of the invention. Block 901 shows a HMD receiving an image through a camera. Block 903 shows an augmented reality function used to identify a system from the image. Block 905 shows a visual recognition function used to recognize the system from a data library in the HMD. Block 907 shows the HMD forwarding information about the system through a middleware. Block 909 shows the HMD processing information to be forwarded to a network service to request a plurality of sensor inputs received from a controller device. Block 911 shows the network service forwarding an encrypted message through a transceiver on the HMD. Block 913 shows a message is being routed to the transceiver on the controller device. Block 915 shows the network service receives the message through the transceiver on the controller device. Block 917 shows the controller device processing the message received from the transceiver on the controller device. Block 919 shows the controller device requesting information from a peripheral interface for information on the plurality of sensor inputs. Block 921 shows the controller device processing information received from the plurality of sensor inputs. Block 923 shows the network service forwarding an encrypted message back through the transceiver on the controller device. Block 925 shows the message is being routed to the transceiver on a HMD. Block 927 shows the network service receives the message through the transceiver on the HMD. Block 929 shows the HMD processes the information from the transceiver. Block 931 shows the HMD displays information on the plurality of sensor inputs from a graphical user interface display system. Block 933 shows the HMD receives a voice input from a microphone. Block 935 shows a voice recognition function is used to identify a voice command pattern. Block 937 shows a generate voice command list function is used to pair the voice command pattern with a reference command pattern from the data library in the HMD. Block 939 shows the HMD receives a motion input from the camera. Block 941 shows a gesture recognition function is used to identify a gesture command pattern. Block 943 shows a generate gesture command list function is used to pair the gesture command pattern with the reference command pattern from the data library in the HMD. Block 945 shows the HMD forwarding information on a command through the middleware. Block 947 shows the HMD authenticating a user using a user access data in an external server. Block 949 shows the HMD processing information to be forwarded to the network service to request a calibration on a plurality of calibration outputs controlled by the controller device. Block 951 shows the network service forwarding the message through the transceiver on the HMD. Block 953 shows the message being routed to the transceiver on the controller device. Block 955 shows the network service receiving the encrypted message through the transceiver on the controller device. Block 957 shows the controller device processing information received from the transceiver on the controller device. Block 959 shows the controller device requesting the plurality of calibration outputs through the peripheral interface. Block 961 shows the controller device making the calibration.

An alternative embodiment allows a user of a HMD to look at a system under test or a marker within its FOV for an exemplary period of time to invoke a Calibrate function to calibrate a plurality of controller devices. Another alternative embodiment allows a user to access a plurality of input devices, such as a keyboard, to issue a command for use thereof in an embodiment of the invention e.g., remote calibration.

Although the invention has been described in detail with reference to certain preferred embodiments, variations and modifications exist within the spirit and scope of the invention as described and defined in the following claims.

The invention claimed is:

1. A secured mobile maintenance and operator system comprising:
    a head mounting device (HMD) comprising a plurality of components wherein said components comprise:
        a microphone;
        an image capture system oriented towards a user field of view (FOV);
        a HMD visual interface comprising a transparent section positioned over said user FOV and a visual interface system configured to display a plurality of visual elements including a graphical user interface onto said transparent section;
        a processing section including a plurality of machine readable processing instructions operable to operate said plurality of components and a command input interface using one or more user command inputs (CI) comprising voice inputs or motion/gesture input recognition;
        a first transceiver and input/output interface configured to communicate with a second transceiver system;
        a secure user authentication system (SUAS) configured to receive user access requests as one of said voice or gesture inputs;
        a machine vision and pattern recognition systems configured to visually identify a system or subsystem of interest (SSoI) in said FOV; and
        an augmented reality (AR) control section operable to generate a configuration interface display configured for displaying at least one 3D model of the SSoI on the HMD visual interface, orienting the 3D model to align and scale over the SSoI in said FOV on said transparent section based on orientation, position, distance, and perspective of said transparent section in relation to said SSoI, obtaining a plurality of SSoI data through said transceiver and input/output section from a remote server comprising SSoI configuration data, displaying one or more of the SSoI data in relation to the 3D model on the HMD visual interface, orienting the SSoI data to align with over top of or next to components of the SSoI displayed on the transparent section of the HMD visual interface;
    wherein one or more of said processing instructions comprise machine readable instructions to execute a change of a configuration setting of a selected SSoI based on one or more said voice inputs or motion/gesture inputs associated with selection and changing one or more configuration settings of a selected said SSoI displayed in said HMD visual interface;
    wherein one or more of said processing instructions comprise machine readable instructions to execute a change of the HMD visual interface to display one or more said SSoI data based on user's selection.

2. A system as in claim 1, further comprising said second transceiver, a network system coupled to said second transceiver, and said remote server communicatively coupled with said network system.

3. A secured mobile maintenance and operator system comprising:
    a head mounted device (HMD) including a plurality of components comprising:
        a visual interface system comprising a visual overlay display system comprising a transparent element configured to generate visual graphical user interfaces (GUI) positioned within a field of view (FOV) of a wearer of said HMD on said transparent element;

at least one video camera configured to record visual inputs oriented to capture images in at least said FOV;

a microphone configured to receive aural inputs in proximity to the HMD comprising user voice command inputs (CI);

a position and orientation section configured to determine position and orientation of the HMD with respect to a reference framework comprising a layout or map of an internal area of a structure and predetermined structures within in said internal area;

a machine vision and pattern recognition system;

an augmented reality (AR) section configured to generate one or more three dimensional (3D) models of a system or subsystem of interest (SSoI) on said visual interface;

a CI control section configured to control one or more CI interfaces and said microphone;

a wireless communication system configured to communicate with said one or more remote data servers and with said one or more SSoI;

a user authentication system (UAS) interface configured to authenticate a user's access credentials and allow access with said one or more remote systems comprising maintenance, configuration management, or systems engineering data stores using the wireless communication system and generate user authentication interfaces and input interfaces for user input of authentication data and enabling access to said one or more remote data servers; and a control section comprising a memory and machine processing control element configured to operate said HMD including said plurality of components and control operation of said machine vision and recognition system, perform data storage and data recall functions with said plurality of components including said memory and said one or more remote data servers, said AR section configured to selectively superimpose at least one said GUI comprising a plurality of computer-generated images on said transparent element comprising a visual overlay display on or within said FOV thus providing a composite view, and said CI control section, said wireless communication system, and said UAS interface;

wherein said control section is configured to execute a local user login process to request the user to input a first authentication data to be granted access to the HMD, wherein the control section is configured to operate said one or more video camera with said machine vision and pattern recognition system that is configured to selectively pattern match identify said SSoI based on said CI or an automatic pattern match identification mode for SSoI's matched with remote pattern matching data stored in said one or more remote data servers or within a local pattern matching data stored in said memory, displaying one or more elements of said 3D model of the selected SSoI on the one or more visual interface of the HMD over the SSoI using said AR section, communicating with SSoI or a SSoI control or monitoring system (SSoICoMs) to obtain a plurality of SSoI data with the SUAS, and displaying one or more of the SSoI data in relation to the 3D model on the HMD visual interface;

wherein the control section is configured to operate the HMD to obtain and display a comparison of said plurality of SSoI data from one or more said SSoIs or said SSoICoMs for SSoIs in said FOV including SSoI operational status data including current operational state and actual SSoI configurable parameters with one or a plurality of predetermined SSoI control settings used to control said SSoI including default configurable parameter settings associated with one of a plurality of SSoI operational modes including startup, operations including power levels, and maintenance operational states;

wherein the control section is configured to operate the HMD and said UAS to obtain and display said comparison of said plurality of SSoI data from one or more said SSoIs or said SSoICoMs for SSoIs in said FOV upon pattern recognition of one or more said SSoIs within said FOV using said machine vision and pattern recognition system or upon receiving a CI request for a change of at least one configurable parameter of the SSoI;

wherein said HMD is configured to execute an authentication process for the CI request with user access data using one or more authentication modes comprising said user access credentials comprising a user name and password, a stored PKI certificate data with a user code or pin.

4. The system as in claim 3, wherein said one or more CI interfaces comprises one or more interfaces comprising voice, keyboard, motion, or gesture recognition CI interface control sections.

5. The system as in claim 3, wherein said machine vision and pattern recognition system that is configured to selectively pattern match identify said SSoI identifies said SSoI by identifying a bar code attached to the SSoI.

6. The system as in claim 3, further comprising said one or more remote data servers comprising a local or remote data storage and at least a portion of said UAS.

7. The system as in claim 3, wherein said HMD further comprises a retina image capture camera positioned to capture an image of said user's retina, wherein said HMD is further configured to execute said authentication process further comprising a retina biometric user authentication mode that includes capturing a retina image from said user and controlling said UAS to compare said retina image to a stored retina image associated with said user.

8. The system as in claim 3, wherein said position and orientation section comprises an inertial navigation unit comprising a three axis gyro and three-axis accelerometer configured to determine orientation of said HMD with respect to said SSoI and a reference plane defined by a structure said SSoI is mounted within.

9. The system as in claim 3, wherein said wireless communication section and said control section communicate with a SSoI wireless communication section to configure said at least one said at least one configurable parameter of the SSoI based on said CI request.

10. A secured mobile maintenance and operator system comprising:

a first section including a first head-mounted device comprising a camera, a microphone, a transceiver, a power unit, a control section, a transparent element positioned in user's field of view (FOV), an image projector configured to project a plurality of images on said transparent element, a pattern recognition system configured to receive images from said camera and match elements of said image with one or more of a plurality of locally or remotely stored patterns including patterns associated with a system or subsystem of interest (SSoI), a first user interface generation section configured for generating a plurality of graphical user interfaces that are projected onto said transparent (GUI), a signal and data input/output interface, a transceiver, and a power unit, and a storage section operable to store a plurality of data and a plurality of non-transitory machine readable instructions configured to control one or more elements of said first section including said control section;

wherein said plurality of data comprises a first, second, third, fourth, fifth, sixth, seventh, eighth, and ninth data, said first data comprising configuration data including a list of said SSoIs, said second data comprising said three-dimensional models of said one or more SSoI in said first data, said third data comprising configurable parameters associated with SSoIs, said fourth data comprising a list of environment conditions experienced by said SSoI, said fifth data comprising predetermined parameter values and sensor values for a plurality of operation environment and a plurality of configurable parameter type associated with one or more of SSoIs in said first data, said data comprising a list of current parameter and sensor value data from one or more of said SSoI listed in said first data, said seventh data comprising a list of user information used for authentication access, said eighth data comprising a list of voice commands, and said ninth data comprises a plurality of gesture command data including gesture pattern recognition data;

wherein said plurality of machine readable computer processing instructions comprise:

a first plurality of machine readable instructions operable to identify one or more said SSoIs using said video camera to capture an image of one of said SSoIs and use said an pattern recognition section to match at least one said stored patterns with said image of one or more said SSoIs;

a second plurality of machine readable instructions operable to display a plurality of 3D models from second data on said transparent element using said image projector;

a third plurality of machine readable instructions operable to communicate with a remote data server by operating said transceiver and signal and data input/output interface;

a fourth plurality of machine readable instructions operable to encrypt a plurality of network data messages transmitted by said transceiver and signal and data input/output interface;

a fifth plurality of machine readable instructions operable to query and collect a plurality of SSoI current configuration setting data from said SSoI through said transceiver and signal and data interface and store in said third data comprising a plurality of configurable parameter type, said fifth plurality of machine readable instructions further operates said first section to display one or more of said third data on said transparent element showing current sensor values and current parameters of said SSoI within said FOV;

a sixth plurality of machine readable instructions operable to collect a plurality of predetermined setting data associated with said SSoI and a plurality of operation environment data associated with SSoI identified and store in said eighth data and displaying the information on said transparent section using said image projector to show said default settings required for said SSoI in a current operational mode in an operation environment;

a seventh plurality of machine readable instructions operable to operate said microphone to obtain a one or a plurality of voice inputs from said microphone and compare the voice inputs to plurality of stored voice patterns associated with one or more voice command list data respectively associated with one or more of a plurality of voice command execution machine readable instructions, determining a match between said voice input and said voice command list data, and executing a matched said voice command data execution machine readable instructions;

an eighth plurality of machine readable instructions operable to receive a user gesture input image from said camera and compare the user gesture input image in said ninth data and execute a gesture command data execution machine readable instruction if matched;

a ninth plurality of machine readable instructions operable to change a plurality of configurable parameters associated with the SSoI based on said matched voice input and said voice command data list; and a tenth plurality of machine readable instructions operable to request user access information to allow the user to make changes to the configurable parameters in said third data.

11. The system as in claim 10, wherein said pattern recognition system configured to receive images from said camera and match elements of said image with one or more of said plurality of locally or remotely stored patterns including patterns associated with a system or subsystem of interest (SSoI) is configured to read bar codes attached to the SSoI to identify said SSoI based on stored bar code identification data.

* * * * *